PHONOGRAPH RECORD VACUUM CLEANER

Filed July 7, 1959

William W. Taylor
Richard O. Spencer
INVENTORS
BY Clarence A. O'Brien
and Harvey B. Jacobson
Attorneys

United States Patent Office 3,005,223

Patented Oct. 24, 1961

3,005,223

PHONOGRAPH RECORD VACUUM CLEANER

William W. Taylor, 21830 Pacific Coast Highway, Malibu, Calif., and Richard O. Spencer, 640 Resalano Drive, Pacific Palisades, Calif.

Filed July 7, 1959, Ser. No. 825,452
5 Claims. (Cl. 15—310)

This invention relates generally to phonograph equipment and more particularly to a vacuum cleaner particularly designed for cleaning the surface of and removing the dust from phonograph records.

In recent years, there has been a great trend toward improving audio-reproduction in the form of improved phonograph records and magnetic tapes. High fidelity set-ups, which were rare years ago are commonly found in many homes. Though the improvement in equipment and reduction in expense thereof has been noticeable, a burden has been put on the user to preserve the equipment and prevent damage thereto in order to maintain the rated high fidelity characteristics. In accordance therewith, special handling is recommended by the manufacturer of phonograph records and special cloths have been developed for cleaning them. Though the utilization of the special cloths and brushes carried by the phonograph arms prove somewhat satisfactory, it has been found that neither is entirely adequate to fully serve the intended function. Accordingly, the applicant herein has developed a phonograph record vacuum cleaner for cleaning the surfaces of a phonograph record for removing dust and other particles which may settle thereon so as to allow the audio equipment associated therewith to function according to its rated characteristics unencumbered by undesirable particles, as dust.

It is the principal object of this invention to provide a novel vacuum cleaner for easily and efficiently removing dust from the surfaces of a phonograph record.

It is a further object of this invention to provide a phonograph record vacuum cleaner which incorporates means for automatically creating a vacuum adjacent the phonograph surfaces upon the insertion of the phonograph record into the vacuum cleaner.

It is a still further object of this invention to provide a phonograph record vacuum cleaner which is simple in construction and accordingly, durable, inexpensive and relatively maintenance free.

In accordance with the above stated objects, below is particularly described the construction and utilization of the phonograph record vacuum cleaner forming the subject matter of this specification. Initially, a housing having a continuous opening for receiving the phonograph record in a vertical position, preferably, is utilized. Rollers are carried within the housing aligned with the continuous opening whereby they may support the phonograph record which may be turned by hand so that the circumferential edge of the phonograph record rides along the rollers. A pairs of tubes are positioned on either side of the opening defining elongated apertures therein. The apertures defined by the tubes will be disposed opposite the record surfaces when the record is received within the continuous opening. A chamber having a rotor therein communicates with the tubes so that the rotor carrying blades thereon tends to create a vacuum in the tubes. A receptacle is detachably removably secured in communication with the chamber for receiving deposits of dust and foreign particles removed from the record surfaces. The rotor is driven by a motor which has a switch serially connected thereto. The switch includes a pivotally and resiliently mounted arm which has terminally secured thereto a roller. The roller secured to the arm, upon engagement by the phonograph record pivots the pivotal arm donwardly to close the switch to start the motor and drive the rotor in order to create a vacuum at the elongated apertures defined in the tubes opposed to the record surfaces. Accordingly, it will be seen that upon insertion of the phonograph record, the vacuum cleaner will automatically start and the user need merely rotate the phonograph record on the rollers for efficiently removing the dust and foreign substance simultaneously from both sides of the phonograph record.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
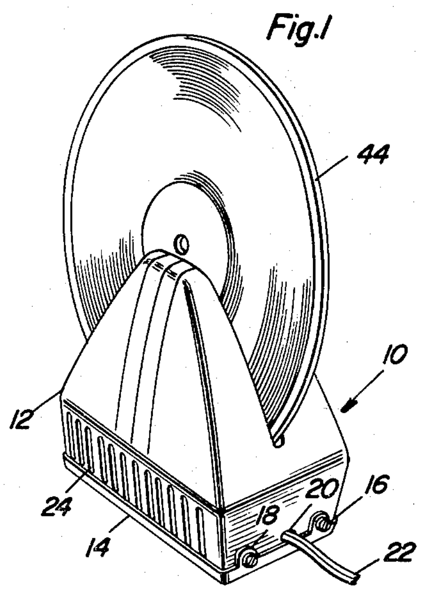
FIGURE 1 is a perspective view illustrating the vacuum cleaner receiving a phonograph record.

With continuing reference to the drawings, numeral 10 generally represents the phonograph record vacuum cleaner and includes an upper housing portion 12 and a lower housing cover 14 secured to the housing portion 12 by screws 16 extending through ears 18. A semi-circular opening 20 is defined in the lower portion of housing 12 to allow the conventional conductor 22 to pass therethrough. Vent openings 24 are defined in the sides of the upper housing portion 12 for allowing the escape of heat from the housing. Though the upper housing portion 12 is illustrated as having upwardly converging side walls, this particular construction is of course not imperative and variations in the design characteristics of the invention may be made without departing from the principles herein taught.

A continuous opening 26 is defined in the upper housing portion 12. Opposed cushions, as of felt, are secured adjacent the opening 26 and designated by the numeral 28. The cushioning 28 may be gripped between jaws as at 30 formed adjacent the opening 26. However, it is apparent that any desired means may be utilized to secure the cushions 28 adjacent the opening 26.

Figure 3:
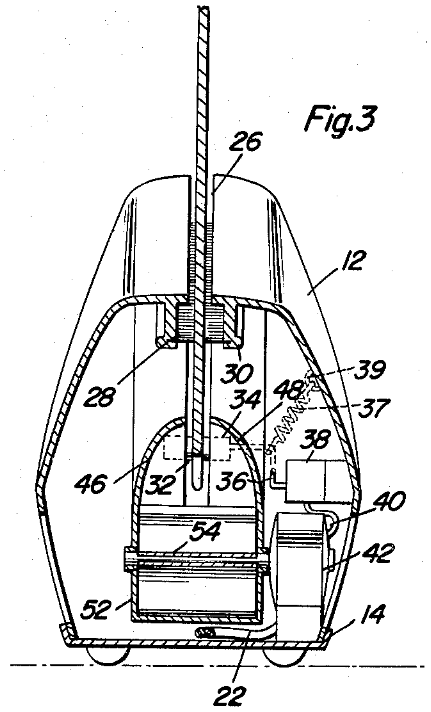
FIGURE 3 is a sectional view taken substantially along the plane 3—3 of FIGURE 2.

A first roller 32 is rotatably carried within the housing portion and alined with the opening 26. A second roller 34 is rotatably carried at the end of a resiliently and pivotally mounted arm 36 which is associated with a microswitch 38. The switch 38 is normally opened by a resilient means such as a coil tension spring 37 connected between the upper end in arm 36 and a hook 39 fixed to the inside of cover 12 (FIGURE 3), but may be closed by pivoting the arm or switch actuator 36 downwardly against the force of spring 37. The switch 38 is serially connected as by conductor 40 to a motor 42 secured in the housing. The conductor 22 is electrically connected to the motor 42 for supplying energy thereto. Accordingly, it will be immediately apparent that upon insertion of a phonograph record 44 into the opening 26, the phonograph record 44 will engage the rollers 32 and 34 and the roller 34 will pivot the arm or switch actuator 36 to close the normally open switch 38 to electrically supply the motor 42.

Figure 2:
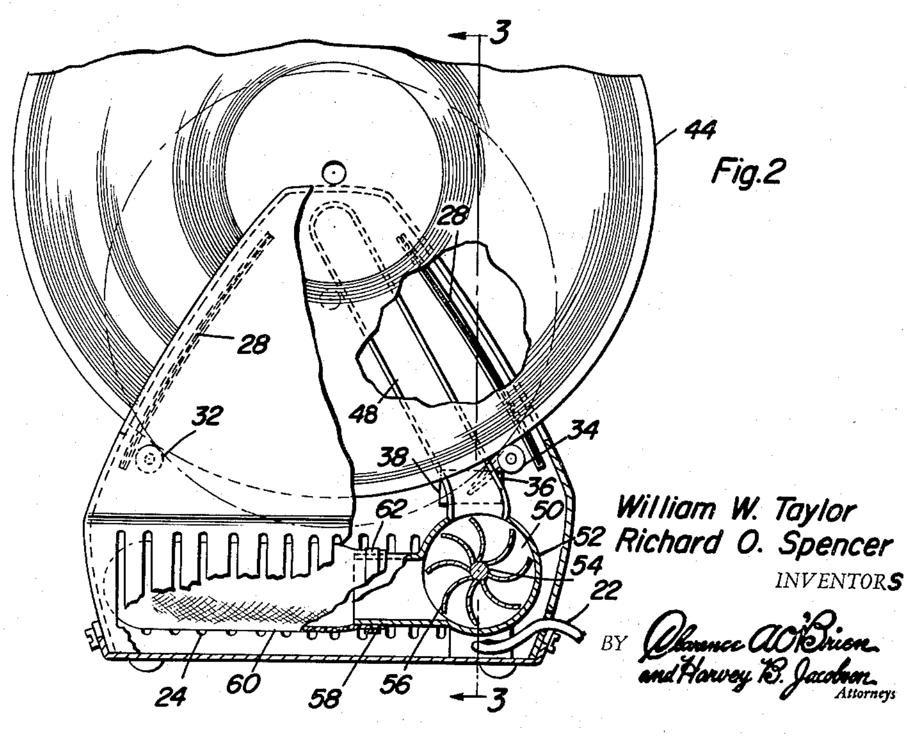
FIGURE 2 is an enlarged fragmentary partially broken away view of the vacuum cleaner showing the cleaner receiving records of different sizes.

A pair of tubes 46 and 48 are positioned on either side of the opening 26 with the tubes defining a bisecting plane therebetween coincident with the opening 26. The tubes 46 and 48 have elongated apertures therein which are opposed to each other and to the respective surfaces of the phonograph record 44. A chamber 50 is denoted by a cylindrical wall 52 and a rotor including a shaft 54 and blades 56 are disposed for rotation therein. The shaft 54 is directly connected to the motor 42 whereby the rotor including the shaft 54 and blades 56 will be driven upon energization of the motor 42 by pivoting the switch actuator 36 upon engagement of the record 44 with the roller 34. The tubes 46 and 48 communicate with the chamber 50 defined by the cylindrical wall 52 as is particularly illustrated in FIGURES 2 and 3. Accordingly, it will be apparent that upon rotation of the rotor in the chamber 50, air will be drawn through the tubes 48 so as to tend to create a vacuum and reduce the pressure adjacent the elongated aperture opposed to the surfaces of the phonograph record 44. A discharge neck 58 communicates with the chamber 50 and the neck 58 is adapted to receive thereon a receptacle or bag 60 which may be clamped about the neck by a ring or band 62.

It is thought that the constructional details and operational features of the invention should now be apparent Upon insertion of the phonograph record 44 in the opening 26, the phonograph record 44 will engage the roller 34 to pivot the arm 36 to close the switch 38 and energize the motor 42. A vacuum will be created with tubes 46 and 48 and adjacent the record surfaces. Accordingly, dust or any other foreign substance on the surfaces of the records 44 will be drawn through the tubes 46 and 48 and through the chamber 50 to be discharged through the neck 58 and into the bag 60. In order to clean the entire surface of both sides of the record 44, the record should be manually rotated on the rollers 32 and 34. It will be seen in FIGURE 2 that the vacuum cleaner 10 is adaptable for utilization with various size records.

In order to prevent damage to the surface upon which the vacuum cleaner 10 is supported, rubber feet may be utilized. It should be apparent that when the receptacle or bag 60 becomes full, the screws 16 and lower housing 14 may be removed so the bag 60 may be taken from the discharge neck 58 and emptied.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A phonograph record vacuum cleaner comprising a housing, a continuous elongated opening defined in said housing for receiving a phonograph record, roller means carried within said housing aligned with said opening for supporting said phonograph record, and means positioned on each side of said phonograph record within said housing for creating a vacuum, said vacuum creating means including a pair of spaced elongated tubes having opposed elongated apertures extending substantially radially from the periphery of the record toward the center portion thereof, said spaced tubes defining a bisecting plane therebetween coincident with the plane defined by said elongated opening.

2. A phonograph record vacuum cleaner comprising a housing, a continuous elongated opening defined in said housing for receiving a phonograph record, roller means carried within said housing aligned with said opening for supporting said phonograph record, and means positioned on each side of said phonograph record within said housing for creating a vacuum, said roller means including a roller terminally carried by a pivotally and resiliently mounted arm, and a switch associated with said arm, said switch controlling a power source which drives the vacuum creating means.

3. A phonograph record vacuum cleaner comprising a housing, a continuous elongated opening defined in said housing for receiving a phonograph record, roller means carried within said housing aligned with said opening for supporting said phonograph record, and means positioned on each side of said phonograph record within said housing for creating a vacuum, said vacuum creating means including a pair of spaced elongated tubes having opposed elongated apertures extending substantially radially from the periphery of the record toward the center portion thereof, said spaced tubes defining a bisecting plane therebetween coincident with the plane defined by said elongated opening, a rotor, blades on said rotor, said rotor enclosed in a chamber in communication with said tubes whereby motion of said blades will tend to create in said chamber and tubes, and means for driving said rotor.

4. A phonograph record vacuum cleaner comprising a housing, a continuous elongated opening defined in said housing for receiving a phonograph record, roller means carried within said housing aligned with said opening for supporting said phonograph record, and means positioned on each side of said phonograph record within said housing for creating a vacuum, said vacuum creating means including a pair of spaced elongated tubes having opposed elongated apertures extending substantially radially from the periphery of the record toward the center portion thereof, said spaced tubes defining a bisecting plane therebetween coincident with the plane defined by said elongated opening, a rotor, blades on said rotor, said rotor enclosed in a chamber in communication with said tubes whereby motion of said blades will tend to create in said chamber and tubes, and means for driving said rotor, and a receptacle removably secured in communication with said chamber for receiving dust collected from said phonograph records.

5. A phonograph record vacuum cleaner comprising a housing, a continuous elongated opening defined in said housing for receiving a phonograph record, roller means carried within said housing aligned with said opening for supporting said phonograph record, and means positioned on each side of said phonograph record within said housing for creating a vacuum, said vacuum creating means including a pair of spaced elongated tubes having opposed elongated apertures extending substantially radially from the periphery of the record toward the center portion thereof, said spaced tubes defining a bisecting plane therebetween coincident with the plane defined by said elongated opening, said roller means including a roller terminally carried by a pivotally and resiliently mounted arm, and a switch associated with said arm, a rotor, blades on said rotor, said rotor enclosed in a chamber in communication with said tubes whereby motion of said blades will tend to create in said chamber and tubes, and means for driving said rotor, and a receptacle removably secured in communication with said chamber for receiving dust collected from said phonograph records, said means for driving said rotor including an electric motor, said switch serially connected to said motor.

References Cited in the file of this patent

UNITED STATES PATENTS

| | | |
|---|---|---|
| 1,146,497 | Houdaille | July 13, 1915 |
| 1,237,047 | Howell | Aug. 14, 1917 |
| 2,059,263 | Miller | Nov. 3, 1936 |
| 2,938,732 | Mantell | May 31, 1960 |

FOREIGN PATENTS

| | | |
|---|---|---|
| 255,950 | Great Britain | July 30, 1926 |
| 596,245 | Great Britain | Dec. 31, 1947 |